Aug. 10, 1954  A. C. HOWELL, JR  2,685,985
DRINK DISPENSING APPARATUS
Filed March 5, 1951

INVENTOR.
ALLEYNE C. HOWELL, JR.
BY
Townsend and Townsend
ATTORNEYS

Patented Aug. 10, 1954

2,685,985

UNITED STATES PATENT OFFICE 2,685,985

DRINK DISPENSING APPARATUS

Alleyne C. Howell, Jr., Reno, Nev., assignor of twenty-three per cent to John Redington, twenty per cent to Thomas J. L. Redmond, and eight per cent to George A. Helmer Application March 5, 1951, Serial No. 213,954

4 Claims. (Cl. 222—134)

This invention relates to drink dispensing apparatus and particularly to that type of drink dispensing apparatus wherein a concentrate, as for example, concentrated liquid flavor or fruit juice, and a diluent, as for example water, are measured in proper proportions, are mixed and are dispensed. This invention also relates to the foregoing type of drink dispensing apparatus in which the source of power used to actuate the apparatus consists of water pressure obtained by connecting the apparatus directly to a satisfactory water supply.

It is an object of this invention to provide a new and improved dispensing apparatus which is simple in construction, operation and maintenance, is easy to clean, is easy to adjust and is relatively free from freezing problems.

Other objects of this invention will become apparent from a reading of the description and claims.

This invention resides in the novel details of construction, combination and arrangement of parts particularly pointed out in the appended claims.

Figure 1:
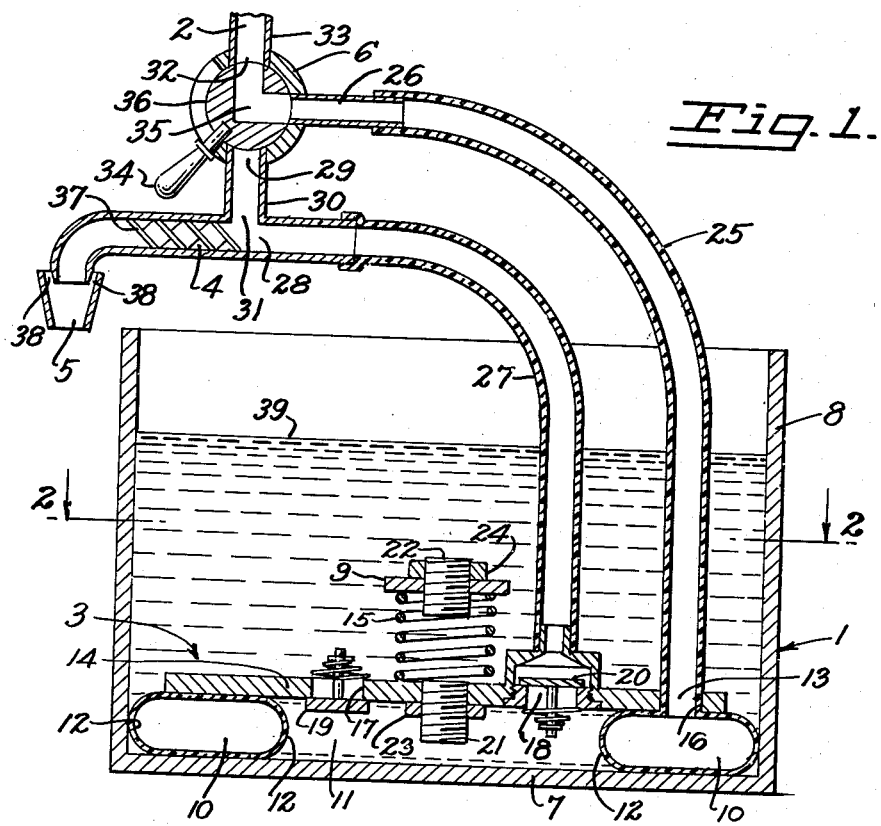
Figure 2:
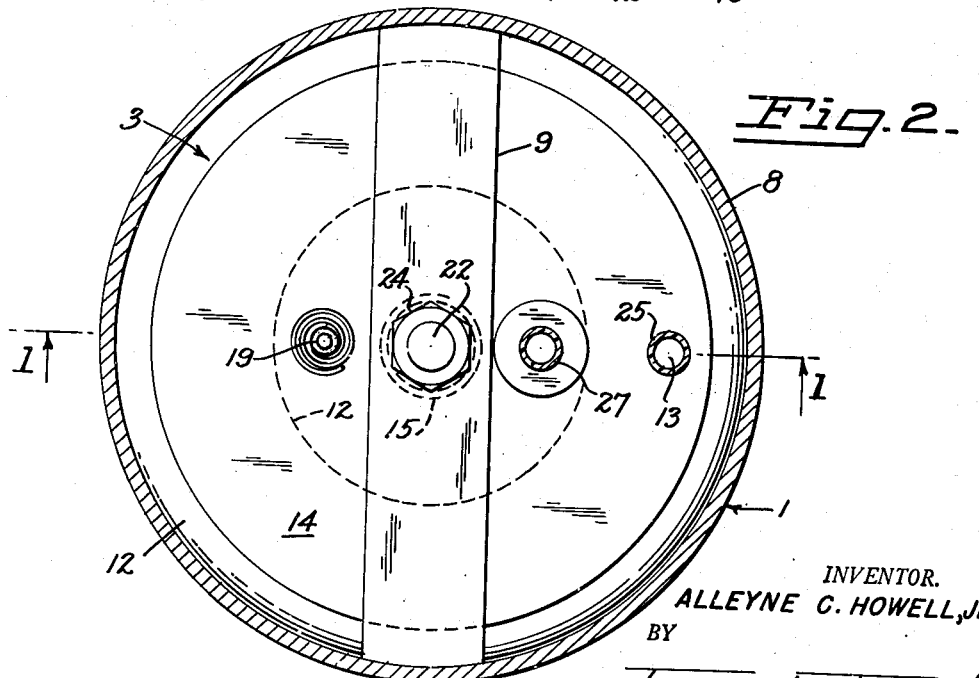

For the purpose of disclosing this invention, there is illustrated one embodiment thereof in the accompanying drawings, in which:

Fig. 1 is a longitudinal sectional view of a dispenser embodying this invention and is taken on the line 1—1 of Fig. 2; and Fig. 2 is a horizontal sectional view of the dispenser illustrated in Fig. 1 and is taken on the line 2—2 of Fig. 1.

Referring to the drawings, the selected embodiment of the invention therein illustrated is arranged to be used in conjunction with a container 1 in which there is placed the concentrated liquid flavor or fruit juice to be measured and dispensed. This liquid is hereinafter referred to as the concentrate. A port 2 is provided to be connected to a source of diluent under pressure, as for example water, which is also to be measured and dispensed. The concentrate and the diluent are to be measured, mixed and dispensed in the manner hereinafter described.

A metering pump 3 is placed in the container 1 for measuring and pumping the concentrate and the diluent. The concentrate and diluent are mixed in a mixing chamber 4 and a nozzle 5 is used to dispense the mixture. The operation of the dispensing apparatus is controlled by a three-way operating valve 6.

The container 1 is provided with a flat bottom 7 and with a cylindrical side wall 8. A flat brace 9 is connected to diametrically opposite points on the side wall of the container.

The pump 3 is located between this flat brace 9 and the bottom 7 of the container 1 and within the side wall 8. The pump 3 has a diluent chamber 10 and a concentrate chamber 11.

The diluent chamber 10 is made in the form of an annular tube and is provided with walls 12 of a flexible material such as polyethylene. The diluent chamber 10 is placed on the bottom 7 of the container 1 and it is provided with a port 13 which is used both as an inlet port and as an exhaust port.

The concentrate chamber 11 is defined by the bottom 7 of the container 1, by the wall 12 of the lesser diameter of the diluent chamber 10, and by a disc 14. The disc 14 is preferably made of a fruit acid resistant plastic and it is arranged to overlie the annular ring 10.

A spring 15 is compressed between the upper surface of the disc 14 and the lower surface of the flat brace 9 to urge the disc 14 downwardly and into tight contact with the upper surface of the diluent chamber 10. A suitable bore 16 is provided for entry to the port 13 of the diluent chamber 10. Disc 14 is also provided with an inlet port 17 and an exhaust port 18. These ports 17 and 18 are closed by spring closed check valves 19 and 20 respectively.

The upper and lower limits of movement of the disc 14 are controlled by two adjustable stops 21 and 22. Stop 21, which controls the lower limit of movement of the disc 14, is a threaded stud which mates with threads in the disc 14 and in a nut 23 secured to the lower surface of the disc 14. Stop 22 which controls the upper limit of movement of the disc 14, is a threaded stud which mates with threads in a nut 24 secured to the upper surface of the flat brace 9. The disc 14, the spring 15, and stops 21 and 22 are arranged coaxially with respect to one another.

The pump 3 is connected to the three-way valve 6, and the mixing chamber 4 by means of two flexible tubes, preferably made of polyethylend hose. One flexible tube 25 interconnects the port 13 of the diluent chamber 10 with the center port 26 of the three-way valve 6. The other flexible tube 27 interconnects the exhaust port of the concentrate chamber 11 with a port 28 of the mixing chamber 4.

The lower port 29 of the three-way valve 6 is connected by a pipe 30 to a second port 31 of the mixing chamber 4. The upper port 32 of the three-way valve 6 is connected to the diluent port 2 by means of a pipe 33. The valve 6 is so constructed and arranged that it has three positions of operation. When the handle 34 is at the lowermost, or "charge" position (Fig. 1), ports 26 and 32 are interconnected by means of a bore 35 in a rotary valve 36 and the rotary valve closes bore 29. When the handle 34 is raised to its mid-position, or "off" position, the rotary valve closes all three ports 26, 29 and 32. When the handle 34 is raised to its upper most, or "pour" position, the bore 35 interconnects ports 26 and 29 and the rotary valve 36 closes port 32.

The mixing chamber 4 is provided with helical mixing vanes 37 and it exhausts into the nozzle 5. An annular air vent 38 is provided in the nozzle 5 to permit aeration of the beverage being dispensed.

The operation of the apparatus will now be described in detail. Concentrate 39 is placed in the container 1 up to any desired level. The port 2 is connected to a suitable source of diluent under pressure, as for example a water line with a pressure of twenty-five pounds per square inch. Assume that the spring 15 has urged the disc 14 downwardly until the stop 21 has contacted the bottom 7 of the container 1.

The three-way valve is now thrown to its lowermost or "charge" position, as is illustrated in Fig. 1. Water under twenty-five pounds pressure flows through pipe 33, port 32, bore 35, port 26, flexible hose 25 and port 13 into diluent chamber 10. This fills diluent chamber 10 and causes it to expand. This expansion urges the disc 14 upwardly until the upper end of stop 21 contacts the lower end of stop 22. Upward movement of the disc 14 causes a reduction in the internal pressure in concentrate chamber 11 and the check valve 19 opens permitting the concentrate 39 to enter through the inlet port 17 into the concentrate chamber 11. When the limit of upward movement has been reached, the pump is charged and the apparatus is ready to serve a drink.

The handle 34 is now moved to its uppermost or "pour" position. This closes port 32 so that the diluent line no longer produces a pressure in the chamber 10. The release of this pressure permits the spring 15 to urge the disc 14 downwardly. This exhausts the water in diluent chamber 10 through port 13, flexible tube 25, port 26, bore 35, port 29, pipe 30 and port 31 into mixing chamber 4. Simultaneously, there is a pressure increase inside the concentrate chamber 11 and the check valve 20 opens. This exhausts the concentrate in chamber 11 through exhaust port 18, flexible hose 27 and port 28 into the mixing chamber 4. In the mixing chamber 4, the diluent and concentrate are mixed as they pass the mixing vanes 37. They are then aerated as they pass the aeration ports 38 and are poured out through nozzle 5.

After the drink is poured the three-way valve 6 may be moved to the center position or "off" position where all ports 32, 26 and 29 of the valve are closed and may be retained there until it is again desired to repeat the foregoing cycle.

From time to time, it will be desirable to clean the apparatus. This is very easily done. The flexible tube 27 is removed from the port 28 and the flexible tube 25 is removed from the port 26. The spring 15 is manually compressed and is removed from its location between the disc 14 and the brace 9. The pump 3 is now slid out from underneath the brace 9 and is removed from the container 1. The diluent chamber 10 and its hose 25 can be removed from the pump 3 by sliding the hose 25 downwardly out through the hole 16 in the disc 14. All of the parts can now be thoroughly cleaned with a minimum of effort. The apparatus is reassembled by reversing this procedure.

It may also be desirable to adjust the pump for the volume and the strength of the drink to be dispensed. The volume of the drink is increased by raising the stop 22. In order to increase the strength of the drink the stop 21 is lowered in its nut 23. In order to reduce the strength the stop 21 is raised in its nut 23. Also if these ranges of adjustment are insufficient, different sized annular rings 10 may be provided.

It will become apparent that this apparatus may be placed in the usual cold compartment of a fountain, for example without becoming inoperative because of freezing. This, because the flexible character of the hose 25 and the chamber 10 will cause any surface ice to break upon change of shape of the hose or the chamber. In this connection, it is recommended that the hose 25 be provided with a cross-section of normally oval shape, the shape illustrated in Fig. 2 being the shape under normal operating pressure.

The invention is hereby claimed as follows:

1. Apparatus for measuring and dispensing a liquid concentrate and diluent comprising a container for concentrate, said container having a bottom; a measuring pump within said container comprising an annular tube having flexible walls, and an open port, said annular tube resting upon the bottom of said container, a flat disc resting on top of said annular tube, an inlet port in said disc, said inlet port being arranged to be in proximity with concentrate in the container, a check valve for normally closing said inlet port, an exhaust port in said disc, a check valve for normally closing said exhaust port, a spring for urging said disc toward said bottom, an adjustable stop for limiting the downward movement of said disc and an adjustable stop for limiting the upward movement of said disc; a mixing chamber having two inlet ports and one exhaust port; a three-way control valve for said pump, said three-way valve being provided with two end ports and one center port, the two end ports being selectively connectable to said center port; one end port of said valve being connectable to a source of diluent under constant pressure; a pipe connecting the other end port to one inlet port of said mixing chamber; a flexible hose connecting the middle port of said valve to the open port of said annular tube; a flexible hose connecting the exhaust port on said disc with the other inlet port on said mixing chamber; and a pouring spout connected to the exhaust port of said mixing chamber.

2. Apparatus for measuring and dispensing a liquid concentrate and diluent including a container for concentrate, said container having a bottom; a measuring pump within said container comprising an annular tube having extensible walls, and an open port, said annular tube resting upon the bottom of said container, a flat disc resting on top of said annular tube, a normally closed inlet port in said disc, said inlet port being arranged to be in proximity with concentrate in the container, a normally closed exhaust port in said disc, means for urging said disc toward said bottom, means for limiting the downward movement of said disc and means for limiting the upward movement of said disc; a pouring spout; means for directing diluent under pressure to said open port; means for directing fluid from said open port to a pouring spout;

and means for directing concentrate from said exhaust port to said pouring spout.

3. Apparatus for measuring and dispensing a liquid concentrate and diluent including a container for concentrate, said container having a bottom; a measuring pump within said container comprising an annular tube having flexible walls and an open port, said annular tube resting upon the bottom of said container, a flat disc resting on top of said annular tube, an inlet port in said disc, said inlet port being arranged to be in proximity with concentrate in the container, a check valve for normally closing said inlet port, an exhaust port in said disc, a spring for urging said disc toward said bottom, an adjustable stop for limiting the downward movement of said disc and an adjustable stop for limiting the upward movement of said disc; a mixing chamber; a pouring spout connected to said mixing chamber; a port connectable to a source of diluent under constant pressure; and a three-way valve having three ports and a valve member in said valve arranged in one position of operation to connect the first port of said valve with the second port of said valve, arranged in another position to connect said first port with the third port of said valve and to close said second port, and arranged in a third position of operation to close all three ports, said first port being connected to the open port of said annular tube; said second port being connected to said port connectible to a source of diluent under constant pressure and said third port being connected to said mixing chamber and to said exhaust port in said disc whereby the valve means are arranged and adapted in one position of of operation to close the flow of diluent from said port connectable to said source of diluent under constant pressure, in a second position to connect said port connectable to a source of diluent under constant pressure and said open port in said annular member, and in a third position (a) to again close said port being connectable to said source of diluent under constant pressure, (b) to connect said open port in said annular member and said mixing chamber and (c) to connect said exhaust port in said disc and said mixing chamber.

4. An apparatus for measuring and dispensing a liquid concentrate and diluent apparatus including a container for concentrate, said container having a bottom; a measuring pump within said container including an annular tube having extensible walls and an open port, said annular tube resting upon the bottom of said container, a flat disc resting on top of said annular tube, a normally closed inlet port in said disc, said inlet port being arranged to be in proximity with concentrate in the container, an exhaust port in said disc, means for urging said disc toward said bottom of said container, means for limiting the downward movement of said disc, and means for limiting the upward movement of said disc; a pouring spout and means for directing, in one cycle of operation, diluent under pressure to said open port in said annular member, and in a second cycle of operation, diluent from said open port in said annular member and from said exhaust port in said disc to said pouring spout.

References Cited in the file of this patent

UNITED STATES PATENTS

| Number | Name | Date |
| --- | --- | --- |
| 597,477 | Wine | Jan. 18, 1898 |
| 853,670 | Yanacopoulo | May 14, 1907 |
| 855,310 | Hentgen | May 28, 1907 |

FOREIGN PATENTS

| Number | Country | Date |
| --- | --- | --- |
| 102,948 | Australia | Jan. 11, 1938 |